United States Patent
Farkas et al.

(10) Patent No.: US 9,528,598 B2
(45) Date of Patent: Dec. 27, 2016

(54) SHIFTER ASSEMBLY HAVING A DEVICE FOR COUPLING A SHROUD TO A LEVER AND CORRESPONDING METHOD

(71) Applicant: Kongsberg Automotive AB, Mullsjö (SE)

(72) Inventors: Viktor Farkas, Mullsjö (SE); Karin Svensson, Jönköping (SE)

(73) Assignee: Kongsberg Automotive AB, Mullsjö (SE)

( * ) Notice: Subject to any disclaimer, the term of this patent is extended or adjusted under 35 U.S.C. 154(b) by 295 days.

(21) Appl. No.: 14/398,655

(22) PCT Filed: May 3, 2013

(86) PCT No.: PCT/IB2013/000852
§ 371 (c)(1),
(2) Date: Nov. 3, 2014

(87) PCT Pub. No.: WO2013/164680
PCT Pub. Date: Nov. 7, 2013

(65) Prior Publication Data
US 2015/0128741 A1    May 14, 2015

Related U.S. Application Data

(60) Provisional application No. 61/642,093, filed on May 3, 2012.

(51) Int. Cl.
*F16H 59/02* (2006.01)
*B60Q 3/02* (2006.01)
(Continued)

(52) U.S. Cl.
CPC ........... *F16H 59/0278* (2013.01); *B60K 20/04* (2013.01); *B60Q 3/024* (2013.01);
(Continued)

(58) Field of Classification Search
CPC .................. F16H 59/0278; F16H 59/0213
See application file for complete search history.

(56) References Cited

U.S. PATENT DOCUMENTS 3,262,224 A    7/1966    Hardesty
5,602,525 A    2/1997    Hsu
(Continued)

FOREIGN PATENT DOCUMENTS

CN    201151365 Y    11/2008
DE    40 40 955 C1    1/1992
(Continued)

OTHER PUBLICATIONS

Machine-assisted English language translation of DE4040955 extracted from www.espacenet.com on May 19, 2015; 14 pages.

(Continued)

*Primary Examiner* — Terence Boes
(74) *Attorney, Agent, or Firm* — Howard & Howard Attorneys PLLC (57) ABSTRACT

A shifter assembly (23) for selecting one of a plurality of gears of a transmission of a vehicle. The shifter assembly includes a lever (24) having a retention surface (34) and defining a first engagement feature (36) and a shroud (48) at least partially disposed about the lever. A collet 54) is at least partially disposed about the lever and is movable. An actuator (58) has a second engagement feature (68) selectively engaging the first engagement feature and has an abutment surface (60) selectively engaging the collet. The actuator rotates about the lever from an unlocked position to a locked position which facilitates engagement of the abutment surface with the collet and correspondingly moves the collet to sandwich the shroud between the collet and the retention surface of the lever. The actuator further defines a (Continued)

cable passage (78) and the shifter assembly includes a cable (46) with the cable extending through the cable passage.

16 Claims, 10 Drawing Sheets (51) Int. Cl.
*F21V 7/00* (2006.01)
*B60K 20/04* (2006.01)
*G05G 1/04* (2006.01)
*G05G 25/04* (2006.01)
*G05G 1/06* (2006.01)
*G05G 1/10* (2006.01)

(52) U.S. Cl.
CPC ........... *F16H 59/0213* (2013.01); *F21V 7/00* (2013.01); *G05G 1/04* (2013.01); *G05G 25/04* (2013.01); *G05G 1/06* (2013.01); *G05G 1/105* (2013.01); *Y10T 29/49954* (2015.01); *Y10T 74/2014* (2015.01)

(56) References Cited

U.S. PATENT DOCUMENTS

| | | | | |
|---|---|---|---|---|
| 6,158,301 | A * | 12/2000 | Smart | G05G 1/06 150/154 |
| 6,930,594 | B1 * | 8/2005 | Wang | B60Q 1/1476 200/43.17 |
| 2001/0055213 | A1 | 12/2001 | Chien | |
| 2004/0095778 | A1 | 5/2004 | Zynda | |
| 2006/0096406 | A1 | 5/2006 | Liu | |
| 2006/0123943 | A1 | 6/2006 | Huber et al. | |
| 2009/0213603 | A1 * | 8/2009 | Lin | B60Q 3/024 362/491 |
| 2010/0013621 | A1 * | 1/2010 | Kazyaka | B60Q 3/046 340/456 |
| 2013/0322961 | A1 * | 12/2013 | Yang | F16B 3/04 403/359.1 |

FOREIGN PATENT DOCUMENTS

| | | |
|---|---|---|
| DE | 297 12 979 U1 | 9/1997 |
| DE | 10 2009 040162 A1 | 3/2011 |
| EP | 2 492 143 A1 | 8/2012 |
| JP | S 58-45134 U | 3/1983 |
| JP | S 61-138630 U | 8/1986 |
| JP | 2007-203823 A | 8/2007 |

OTHER PUBLICATIONS

Machine-assisted English language abstract of DE29712979U1 extracted from www.espacenet.com on May 19, 2015; 11 pages.
Machine-assisted English language translation of JP2007203823A extracted from www.espacenet.com on May 19, 2015; 14 pages.
Machine-assisted English language translation of CN201151365Y extracted from www.espacenet.com on May 19, 2015 17 pages.
Machine-assisted English language translation of DE102009040162A1 extracted from www.espacenet.com on May 19, 2015 13 pages.
International Search Report of WO2013164680A1 dated Jul. 8, 2013, 4 pages.
International Search Report of WO2013164678A1 dated Jul. 15, 2013, 3 pages.

* cited by examiner

SHIFTER ASSEMBLY HAVING A DEVICE FOR COUPLING A SHROUD TO A LEVER AND CORRESPONDING METHOD

RELATED APPLICATION

This application is the National Stage of International Patent Application No. PCT/IB2013/000852, filed on May 3, 2013, which claims priority to and all advantages of U.S. Provisional Patent Application No. 61/642,093, which was filed on May 3, 2012, the contents of which are incorporated herein by reference.

BACKGROUND OF THE INVENTION

1. Field of the Invention

The subject invention generally relates to a shifter assembly for selecting a transmission of a vehicle. In particular, the subject invention relates to unique design to couple a shroud of the shifter assembly to a lever of the shifter assembly.

2. Description of Related Art

There is a desire within the industries utilizing shifter assemblies to couple a shroud to a lever of the shifter assembly. Many techniques have been used to couple the shroud to the lever. One solution in the industry discloses a lever of a shifter assembly having a knob and a shaft extending from the knob. A sleeve extends from the knob and surrounds the shaft. The sleeve has an abutment surface and a locking lip. A shroud is movable disposed adjacent the abutment surface. A retaining bushing is disposed about and is movable along the shaft. A stop ring is also disposed about and movable along the shaft. The stop ring can abut the retaining bushing and move the retaining bushing toward the abutment surface. The stop ring moves the retaining bushing to a locked position in which the retaining bushing is disposed adjacent the abutment surface. In the locked position, the shroud is coupled between the retaining bushing and the abutment surface. Furthermore, the retaining bushing engages the locking lip of the sleeve to retain the retaining bushing in the locked position. The movement of the retaining bushing to the locked position is performed through the solely by the axial force imparted by the stop bushing.

Therefore, there remains an opportunity to develop a shifter assembly having a shroud coupled to the lever, with the shifter assembly having a device which imparts a mechanical advantage to couple the shroud to the lever.

SUMMARY OF THE INVENTION AND ADVANTAGES

The subject invention provides for a shifter assembly for selecting one of a plurality of gears of a transmission of a vehicle. The shifter assembly includes a lever extending along an axis with the lever having a retention surface and defining a first engagement feature. A shroud is at least partially disposed about the lever to at least partially conceal the lever. A collet is at least partially disposed about the lever and is movable along the axis between a first position spaced from the retention surface and a second position sandwiching the shroud between the collet and the retention surface. An actuator has a second engagement feature which selectively engages the first engagement feature of the lever. The actuator has an abutment surface which selectively engages the collet. The actuator rotates about the lever from an unlocked position to a locked position facilitating engagement of the abutment surface with the collet and correspondingly moving the collet from the first position to the second position along the axis to sandwich the shroud between the collet and the retention surface of the lever.

Additionally, the subject invention provides for a method of assembling a shifter assembly for selecting one of a plurality of gears of a transmission of a vehicle. The shifter assembly utilizes a lever extending along an axis. The lever has a retention surface and defines a first engagement feature. A shroud is at least partially disposed about the lever. The shifter assembly also utilizes a collet at least partially disposed about the lever, and an actuator having a second engagement feature and an abutment surface. The method includes the steps of rotating the actuator about the lever from an unlocked position to a locked position and engaging the second engagement feature with the first engagement feature during rotation of the actuator. The method further includes the steps of engaging the abutment surface of the actuator with the collet, moving the collet along the axis from a first position spaced from the retention surface to a second position during rotation of the actuator, and sandwiching the shroud between the collet and the retention surface when in the second position.

Accordingly, the subject invention provides for a shifter assembly having a lever, a collet, and a shroud with the shroud coupled to the lever by sandwiching of the shroud between the collet and the lever, wherein the shifter assembly includes an actuator rotatably engaging the lever and imparting a mechanical advantage on the collet to move the collet into engagement with and sandwiching the shrouding.

BRIEF DESCRIPTION OF THE DRAWINGS

Advantages of the subject invention will be readily appreciated as the same becomes better understood by reference to the following detailed description when considered in connection with the accompanying drawings.

DETAILED DESCRIPTION OF THE INVENTION

Figure 1:
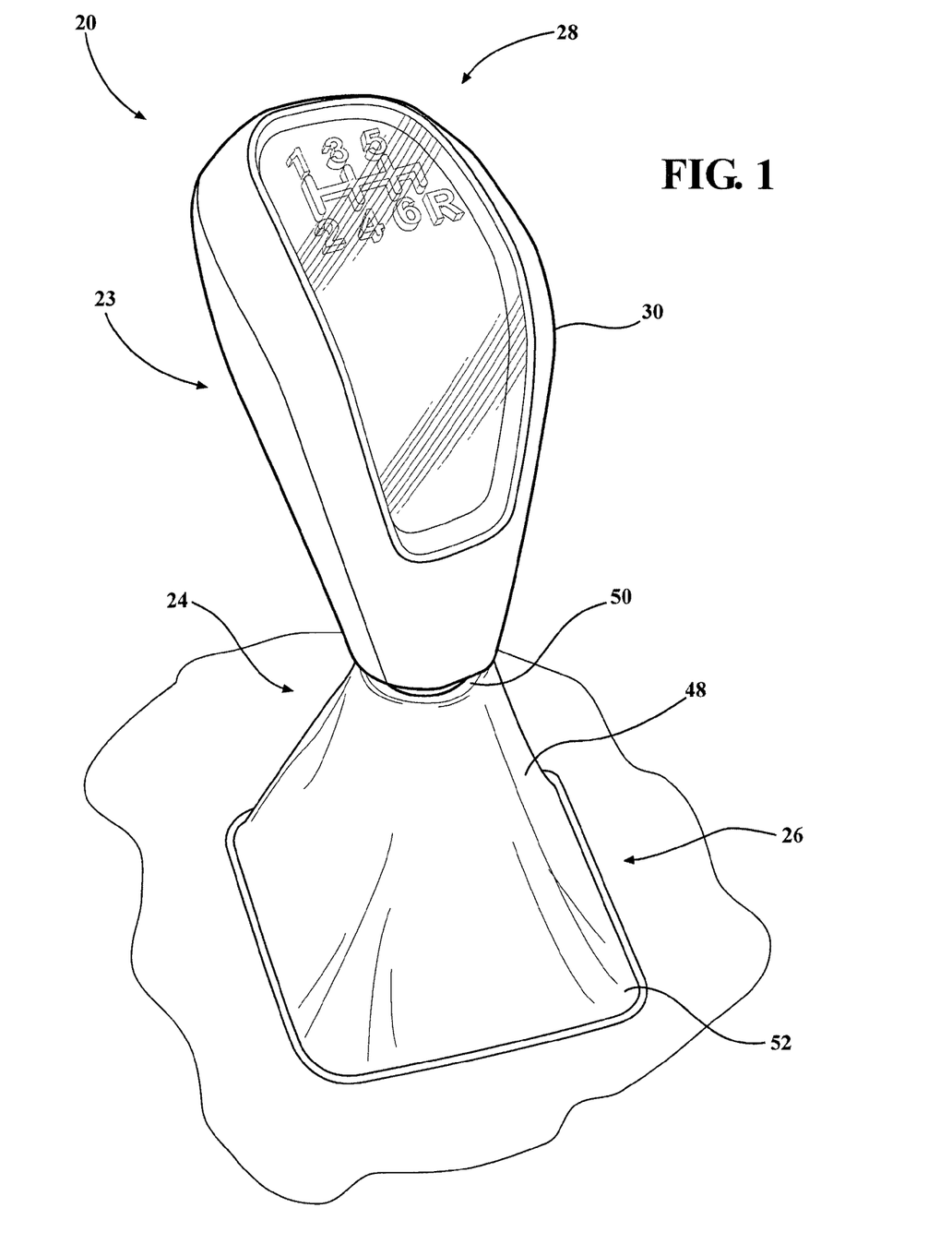
FIG. 1 is a perspective view of a shifter assembly.
Figure 2:
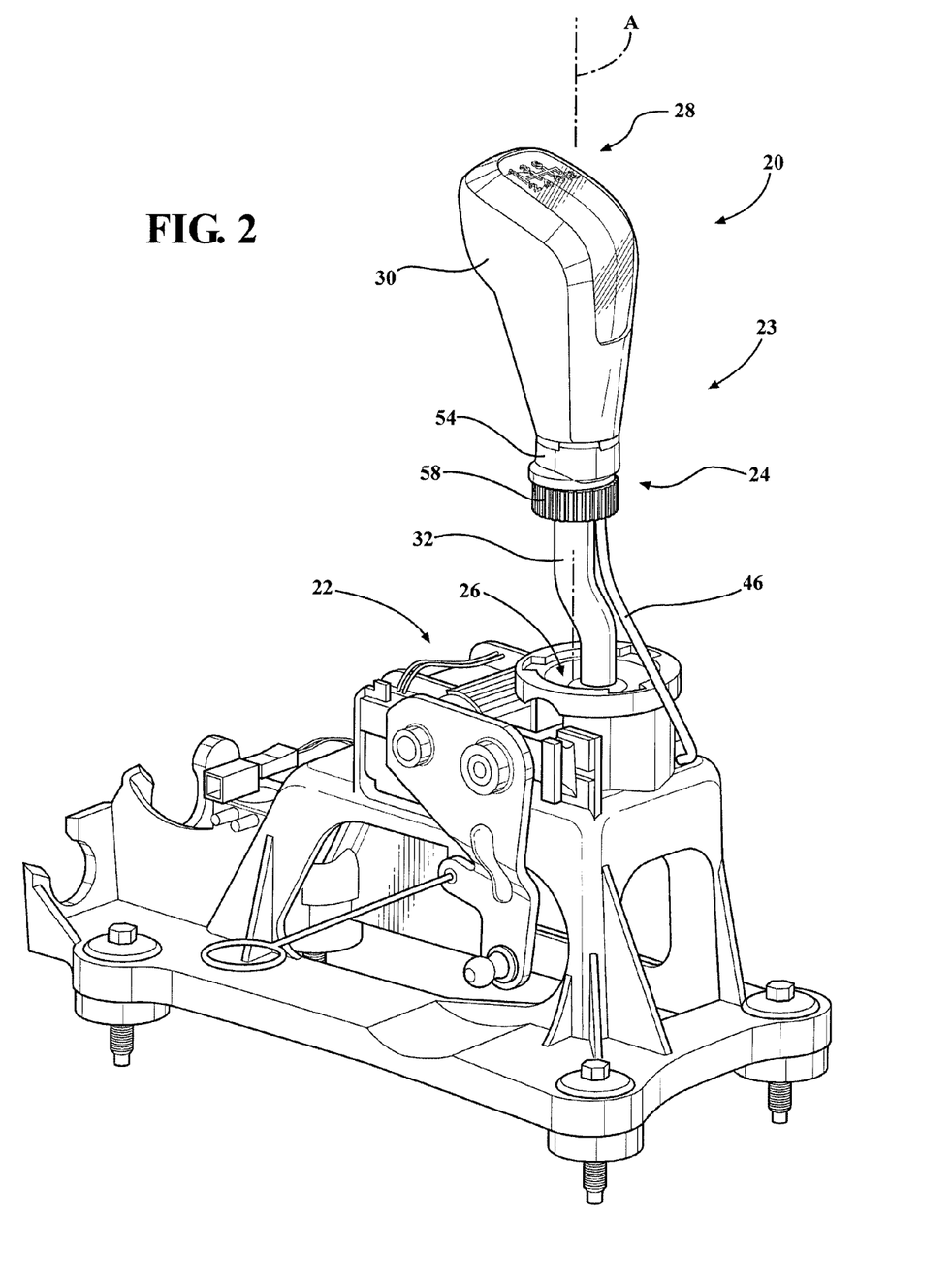
FIG. 2 is a perspective view of the shifter assembly with a shroud of the shifter assembly removed.

Referring to the Figures, wherein like numerals indicate like or corresponding parts throughout the several views, a shifter apparatus 20 for interfacing a transmission of a vehicle is generally shown in FIGS. 1 and 2. The shifter apparatus 20 can be utilized as a cable-operated shifter apparatus and as a shift-by-wire shifter apparatus, as known in the art. However, it is to be appreciated that the shifter apparatus 20 can be utilized in any suitable manner to interface the transmission of the vehicle. For illustrative purposes only, the following disclosure is focused on the shifter apparatus 20 utilized in an automotive application (i.e., the vehicle); however, it should be appreciated that the shifter apparatus 20 may be used in any other appropriate application, including non-vehicular assemblies, without deviating from the scope of the subject invention.

As shown in FIG. 2, the shifter apparatus 20 includes a base 22. The base 22 is fixed to a console of the vehicle. However, the base 22 can be fixed to a floor of the vehicle, a steering column of the vehicle, or any other location of the vehicle for selecting one of the gears of the transmission without departing from the scope of the subject invention. The base 22 can be fixed to the vehicle by bolts, screws, clips, or any other suitable fastener.

Figure 3:
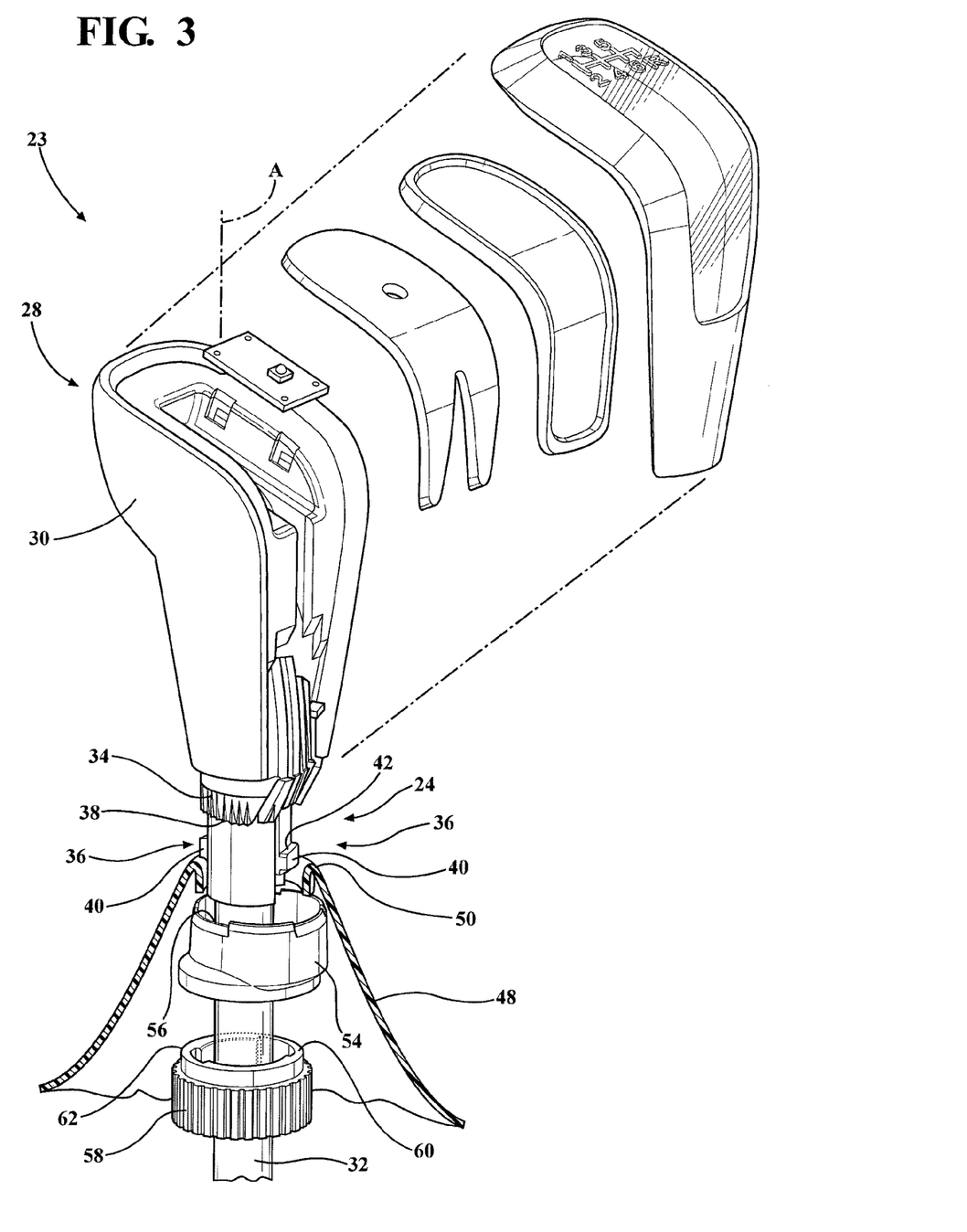
FIG. 3 is an exploded view of the lever shifter assembly.

As shown in FIG. 3, the shifter apparatus 20 includes a shifter assembly 23 for selecting one of a plurality of gears of the transmission of the vehicle. The shifter assembly 23 includes a lever 24 extending along an axis A. As shown in FIG. 2, the lever 24 has a first end 26 and a second end 28 opposite one another with the lever 24 movably coupled to the base 22 at the first end 26. The lever 24 is movable relative to the base 22 either pivotably or linearly. However, it is to be appreciated that the lever 24 can be movably coupled to the base 22 in any suitable configuration.

As shown in FIG. 3, the lever 24 includes a knob 30 and a shaft 32 with the knob 30 disposed along the shaft 32 and the first engagement feature 36 disposed on the knob 30. More specifically, the knob 30 is disposed at the second end 28 of the lever 24 with the shaft 32 extending from the knob 30 to the first end 26 of the lever 24. The knob 30 defines a bore with the shaft 32 extending into the bore to couple the knob 30 and the shaft 32 to one another. However, the knob 30 can abut and be coupled to the shaft 32. It is to be appreciated that the knob 30 can be coupled to the shaft 32 in any suitable configuration.

Figure 4:
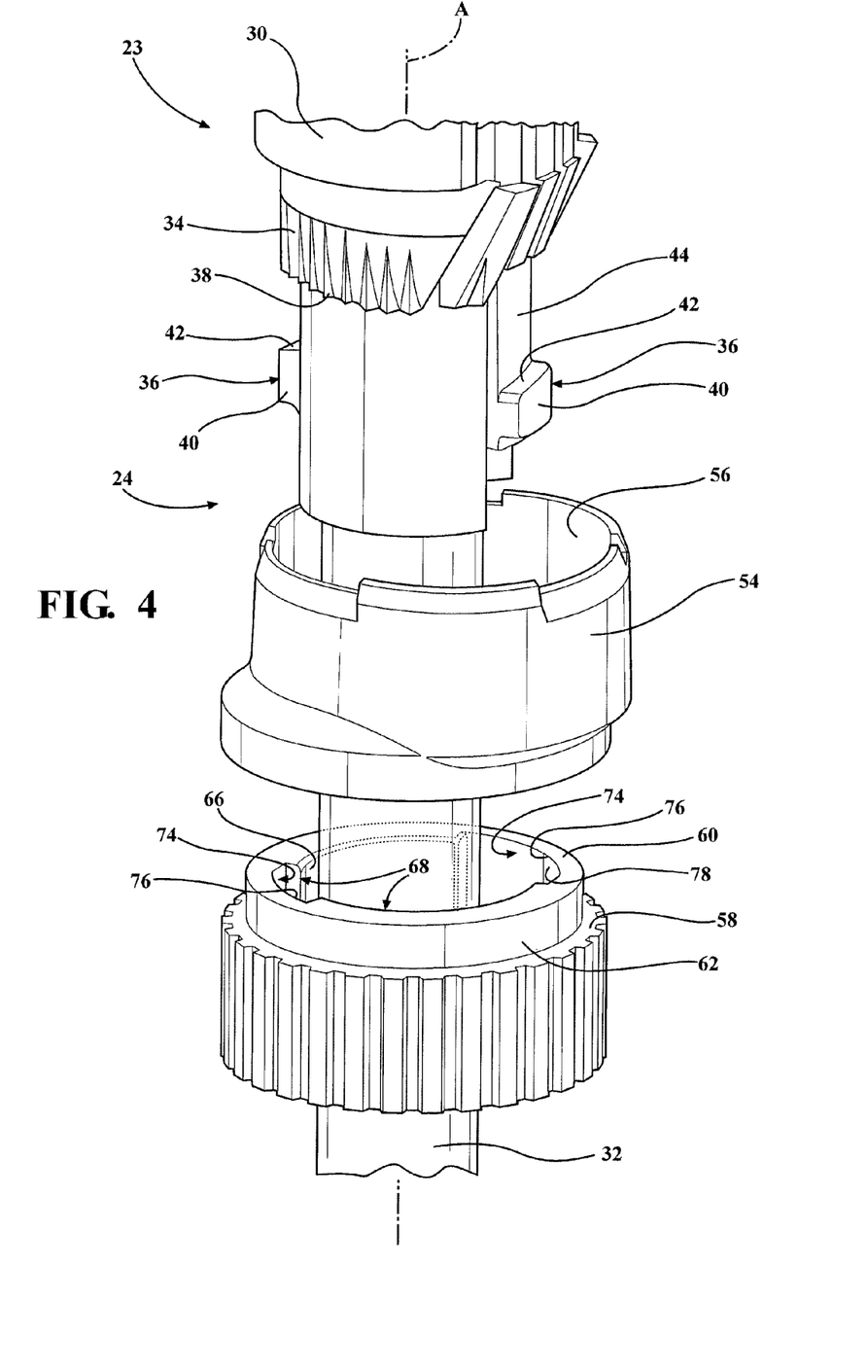
FIG. 4 is an exploded view of the shifter assembly with the shroud removed.

As shown in FIG. 4, the lever 24 has a retention surface 34 and defines a first engagement feature 36. The knob 30 has the retention surface 34 and defines the first engagement feature 36. The retention surface 34 and the first engagement feature 36 are disposed on the knob 30 adjacent the shaft 32. It is to be appreciated that the retention surface 34 and the first engagement feature 36 can be disposed on the shaft 32. The retention surface 34 and the first engagement feature 36 can be disposed anywhere on the lever 24 without escaping the scope of the subject invention.

Figure 5:
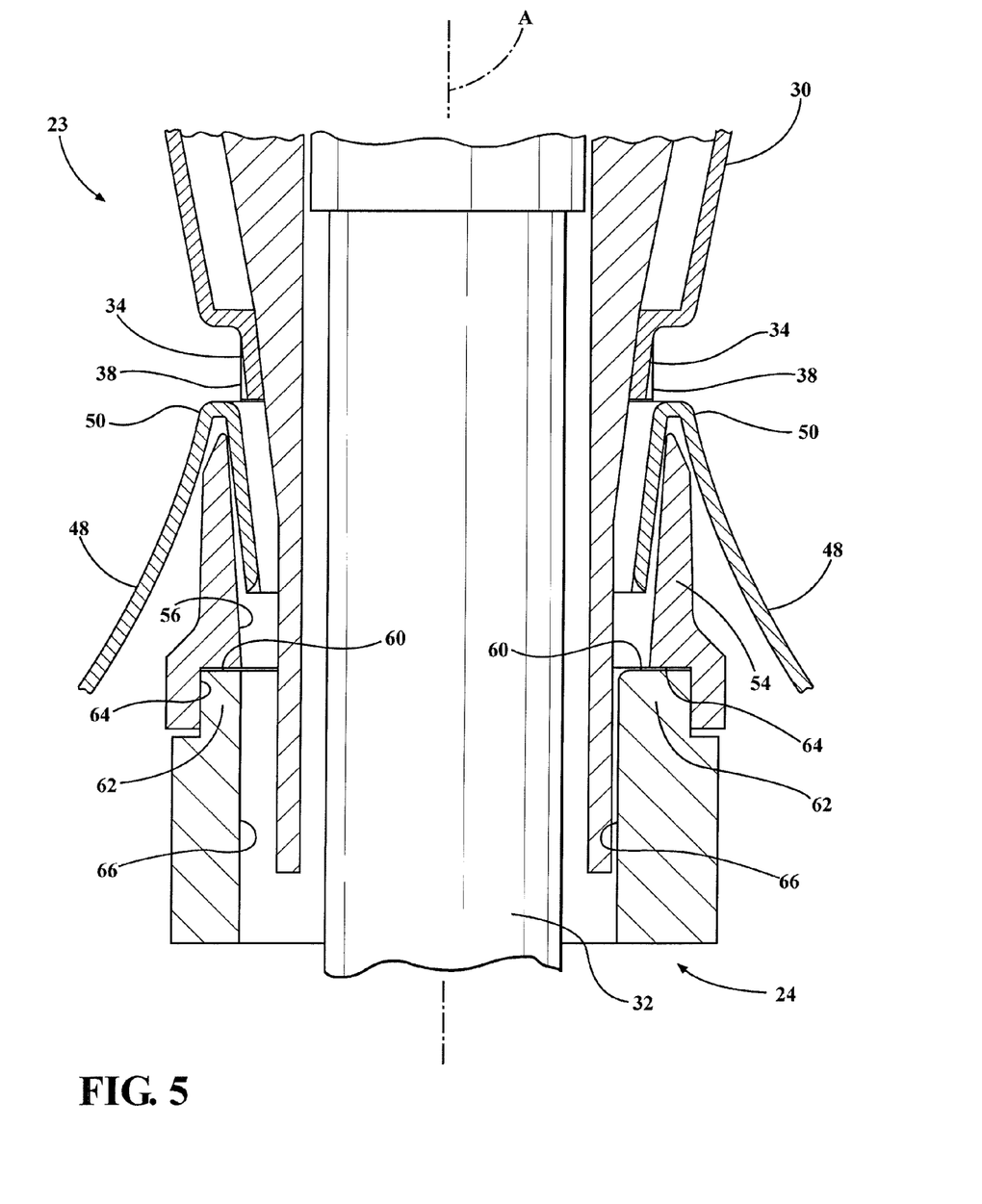
FIG. 5 is a cross-sectional view of the shifter assembly having a collet and an actuator with the collet in a first position and the actuator in an unlocked position.

As shown in FIG. 5, the retention surface 34 has an angular configuration. The retention surface 34 progressively projects outwardly away from the shaft 32. Said differently, the retention surface 34 tapers outwardly as the retention surface 34 progresses away from the shaft 32. It is to be appreciated that the retention surface 34 can progressively project outwardly away from the knob 30. The angular configuration will be better understood through further explanation below.

As shown in FIG. 4, the retention surface 34 defines a plurality of teeth 38 projecting radially from the axis A. The teeth 38 are spaced from one another about the axis A. The teeth 38 extend longitudinally along the lever 24. Said differently, the teeth 38 extend longitudinally along the retention surface 34 toward the first and second ends 26, 28 of the lever 24. The purpose and configuration of the teeth 38 will be better understood through further explanation below.

Figure 8:
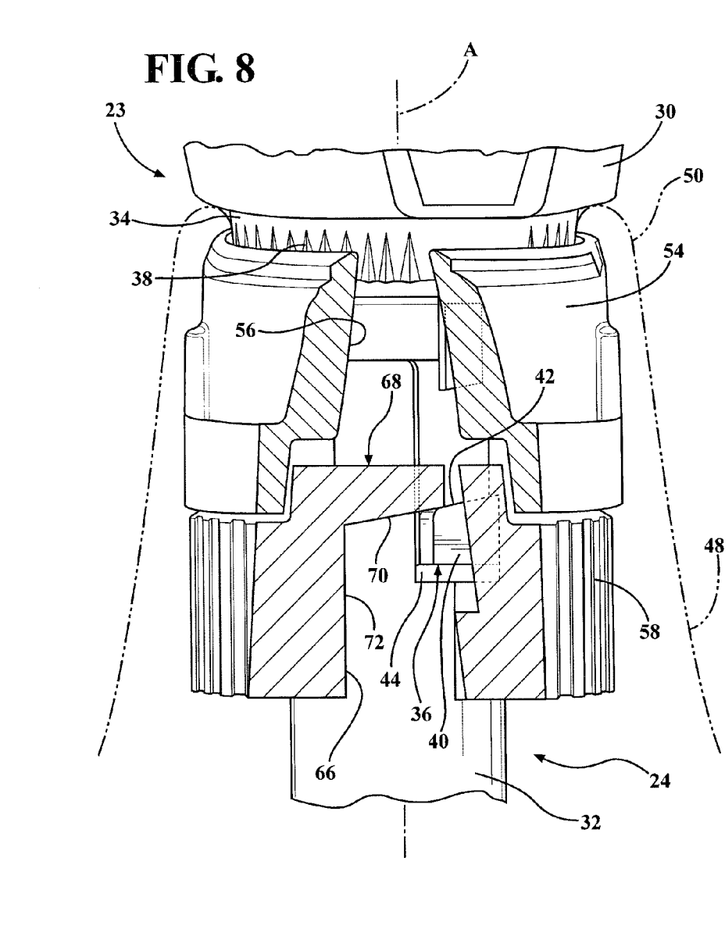
FIG. 8 is a perspective cross-sectional view of shifter assembly with the collet in the first position and the actuator in the unlocked position.
Figure 9:
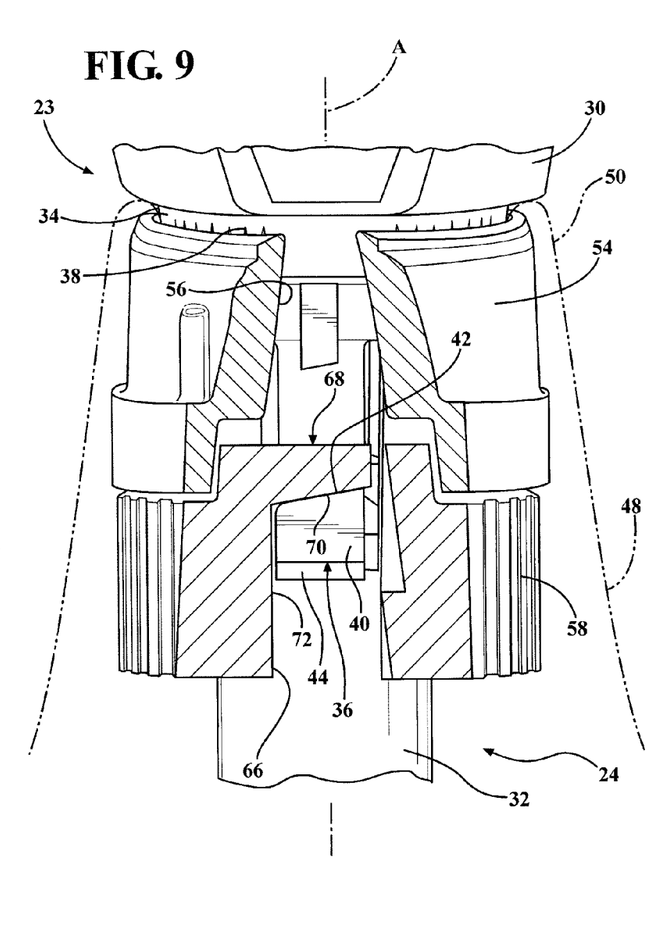
FIG. 9 is a perspective cross-sectional view of shifter assembly with the collet in the second position and the actuator in the locked position, with the rotation of the collet and the lever between FIGS. 8 and 9 performed for illustrative purposes only and are not reflected in actual use.

The first engagement feature 36 is further defined as a protrusion 40. The first engagement feature 36 has a first engagement surface 42 transverse to the axis A. More specifically, the first engagement surface 42 is disposed on the protrusion 40. The first engagement surface 42 faces the second end 28 of the lever 24. As shown in FIGS. 8 and 9, the first engagement surface 42 is angularly disposed relative to the axis A. It is to be appreciated that the first engagement surface 42 can be disposed anywhere on the protrusion 40 of the first engagement feature 36 without escaping the scope of the subject invention.

As shown in FIG. 4, the knob 30 has at least one arm 44 extending along the axis A. The arm 44 extends along the axis A toward the first end 26 of the lever 24. The arm 44 is capable of flexing relative to the axis A. The first engagement feature 36 is disposed on the arm 44. More specifically, the protrusion 40 of the first engagement feature 36 extends outwardly from the arm 44 away from the axis A. The at least one arm 44 is further defined as a pair of arms 44 disposed opposite each other about the axis A. It is to be appreciated that the at least one arm 44 can be any number of arms 44 without escaping the scope of the subject invention.

As shown in FIG. 2, the lever 24 includes a cable 46 disposed along the axis A. The cable 46 from the knob 30 and extends along the shaft 32 toward the first end 26 of the lever 24. The cable 46 is configured to electrically couple the knob 30 to the vehicle.

As shown in FIG. 1, the shifter assembly 23 includes a shroud 48 at least partially disposed about the lever 24 to at least partially conceal the lever 24. The shroud 48 entirely surrounds the lever 24. However, the shroud 48 can be disposed about the lever 24 in any configuration without escaping the scope of the subject invention. The shroud 48 has a lever end 50 coupled to the lever 24 (as will be described in greater detail below) and a console end 52 coupled to the console, steering column, floor, or any other portion of the vehicle. The shroud 48 is generally referred to in the art as a boot or a gaiter. The shroud 48 is formed of a flexible material such as leather, synthetic leather, or the like, which allows for continued coupling of the shroud 48 to the lever 24 and the console as the lever 24 moves relative to the base 22. However, it is to be appreciated that the shroud 48 can be formed of any material having any flexibility, or lack thereof, without escaping the scope of the subject invention.

The at least partial concealment of the lever 24 refers to the covering of at least a portion of the lever 24, which removes the covered portion of the lever 24 from the view of the driver. The concealing of the lever 24 gives an aesthetic appeal in that the shroud 48 smoothly transitions lever 24 into the console, steering column, floor, etc. Furthermore, the coupling of the shroud 48 to the lever 24 and the console, steering column, floor, etc. seals the concealed portion of the lever 24 from outside contaminants including, but not limited to, dirt, dust, and water. Moreover, the shroud 48 conceals the movable coupling of the lever 24 and the base 22. The shroud 48 prevents the outside contaminants from transmitting into and interfering with the movable coupling of the lever 24 and the base 22.

Figure 6:
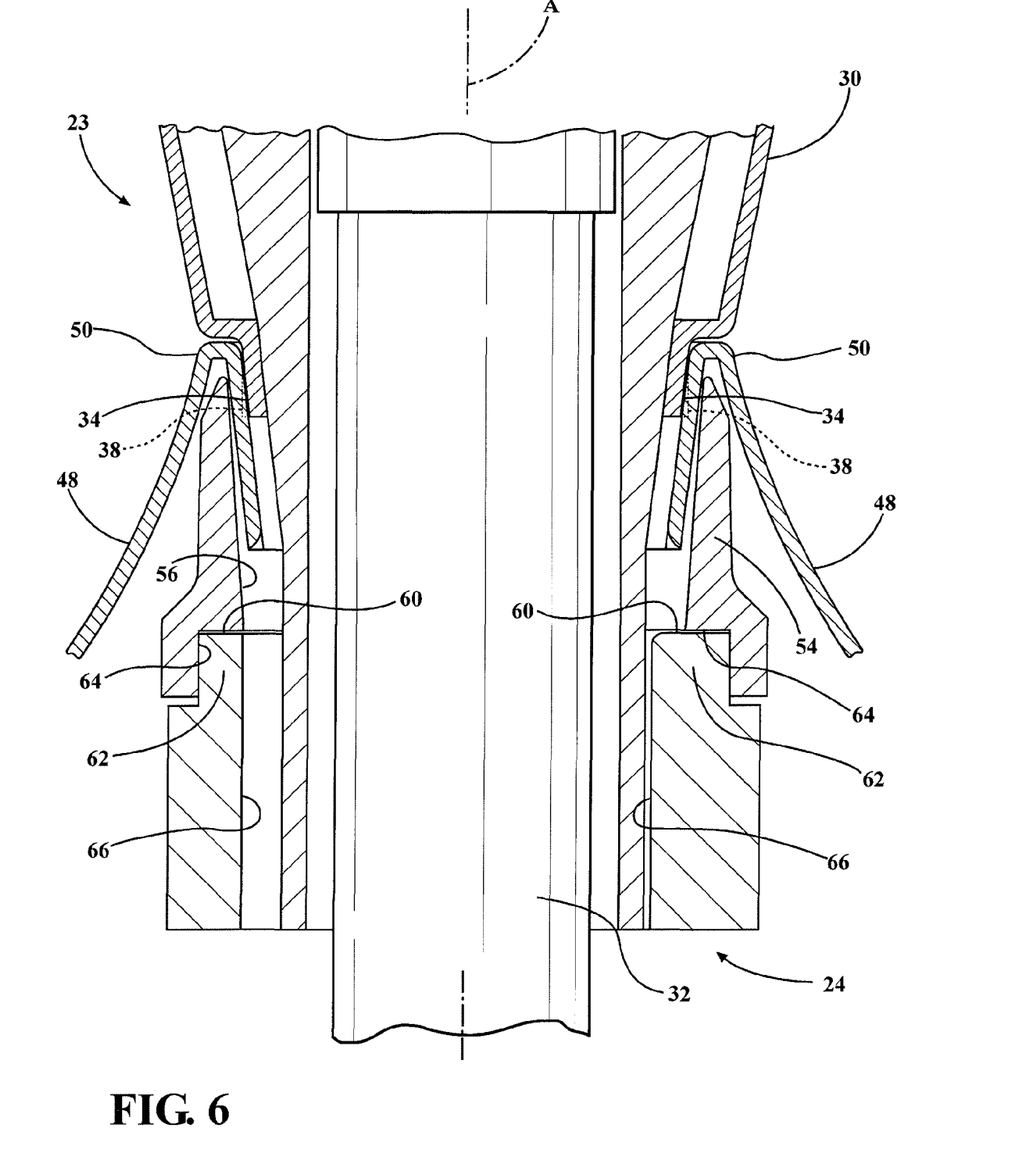
FIG. 6 is a cross-sectional view of the shifter assembly with the collet in a second position and the actuator in a locked position.

As shown in FIG. 4, the shifter assembly 23 includes a collet 54 at least partially disposed about the lever 24 and movable along the axis A between a first position spaced from the retention surface 34, as shown in FIG. 5, and a second position sandwiching the shroud 48 between the collet 54 and the retention surface 34, as shown in FIG. 6. More specifically, the collet 54 has an interior surface 56 facing the retention surface 34 of the lever 24. In the first position, the lever end 50 of the shroud 48 is movably disposed between the collet 54 and the lever 24. Movement of the collet 54 from the first position to the second position engages the lever end 50 of the shroud 48 with each of the interior surface 56 of the collet 54 and the retention surface 34 of the lever 24 which sandwiches the shroud 48 between the collet 54 and the retention surface 34. Sandwiching of the shroud 48 between the collet 54 and the retention surface 34 couples the shroud 48 to the lever 24 such that shroud 48 can move with the lever 24 as the lever 24 moves relative to the base 22.

As shown in FIG. 3, the collet 54 has an annular configuration which facilitates sandwiching of the shroud 48 between the collet 54 and the retention surface 34 entirely about the lever 24. It is to be appreciated that the collet 54 can have any configuration about the axis A which facilitates sandwiching of the shroud 48 between the collet 54 and the retention surface 34.

The angular configuration of the retention surface 34 (set forth above) facilitates increased sandwiching of the shroud 48 as the collet 54 moves from the first position to the second position. Specifically, the angular configuration of the retention surface 34 progressively disposed the interior surface 56 of the collet 54 closer to the retention surface 34 as the collet 54 moves from the first position to the second position. As the collet 54 moves from the first position to the second position, the lever end 50 of the shroud 48 is progressively sandwiched between the collet 54 and the retention surface 34. The angular configuration facilitates ease of movement of the collet 54 from the first position to the second position while correspondingly sandwiching the shroud 48 between the collet 54 and the retention surface 34.

The teeth 38 of the retention surface 34 penetrate the shroud 48 for gripping the shroud 48 sandwiched between the collet 54 and the retention surface 34 of the lever 24 in the second position. As set forth above, the teeth 38 extend longitudinally along the lever 24 which facilitates the collet 54 and the shroud 48 sliding along the teeth 38 and simultaneously penetrating the shroud 48 with the teeth 38 as the collet 54 moves from the first position to the second position. The penetration of the teeth 38 in the shroud 48 facilitate further sandwiching of the shroud 48 between the collet 54 and the retention surface 34 as well as inhibiting rotation of the lever end 50 of the shroud 48 about the lever 24.

The shifter assembly 23 includes an actuator 58. The actuator 58 is at least partially disposed about the lever 24 with collet 54 disposed between the actuator 58 and the knob 30. The actuator 58 has an annular configuration; however, it is to be appreciated that the actuator 58 can have any configuration about the lever 24 without escaping the scope of the subject invention. Furthermore, although the collet 54 is disposed between the actuator 58 and the knob 30, it is to be appreciated that the actuator 58 and the collet 54 can have any order or disposition about or along the lever 24 without escaping the scope of the subject invention.

As shown in FIG. 4, the actuator 58 has an abutment surface 60 selectively engaging the collet 54. More specifically, the actuator 58 has a lip 62 extending toward the collet 54 with the abutment surface 60 disposed on the lip 62. As shown in FIG. 5, the collet 54 defines a notch 64 with the lip 62 extending into the notch 64. The abutment surface 60 engages the collet 54 within the notch 64. The lip 62 and the notch 64 are configured to maintain engagement of the abutment surface 60 with the collet 54 as the actuator 58 rotates about the lever 24 from an unlocked position, as shown in FIGS. 5 and 8, to a locked position as shown in FIGS. 6 and 9. Specifically, the disposition of the lip 62 in the notch 64 prevents the abutment surface 60 from sliding off of and disengaging the collet 54 as the actuator 58 rotates from the unlocked position to the locked position. Furthermore, the annular configuration of the actuator 58 facilitates continued engagement of the abutment surface 60 with the collet 54 during the rotation of the actuator 58 from the unlocked position to the locked position. The rotation of the actuator 58 from the unlocked position to the locked position will be described in greater detail below. It is to be appreciated that the abutment surface 60 can be disposed anywhere on the actuator 58. Furthermore, the abutment surface 60 can be spaced from the lip 62 without escaping the scope of the subject invention. It is also to be appreciated that the cross-section of the actuator 58 in FIGS. 5 and 6 are for schematic purposes only and do not necessarily show every feature of the actuator as disclosed in the subject invention.

Figure 7:
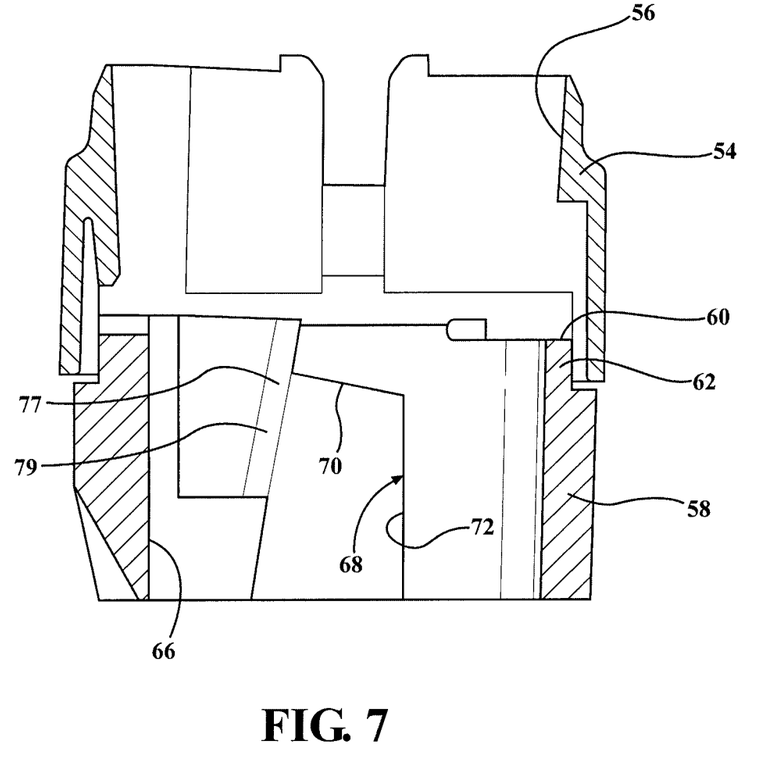
FIG. 7 is a cross-sectional view of the collet and the actuator.

As generally illustrated in FIG. 7, the actuator 58 has an inner surface 66 facing the lever 24. The actuator 58 has a second engagement feature 68 selectively engaging the first engagement feature 36 of the lever 24. The second engagement feature 68 projects inwardly from the inner surface 66 toward the lever 24. The second engagement feature 68 is further defined as a pair of second engagement features 68 disposed opposite one another within the actuator 58. It is to be appreciated that the actuator 58 can have any number of engagement features without escaping the scope of the subject invention. The second engagement feature 68 has a second engagement surface 70 transverse to the axis A. The second engagement surface 70 faces the first end 26 of the lever 24; however, it is to be appreciated that the second engagement surface 70 can have any suitable configuration. The second engagement feature 68 further includes a stop wall 72 transverse to the second engagement surface 70. The stop wall 72 extends substantially parallel to the axis A. It is to be appreciated that the collet 54 and the actuator 58 shown in FIG. 7 are of an alternative embodiment. It is to be appreciated that the structure and function described in this paragraph and supported by FIG. 7 are representative of all embodiments of the present invention.

As shown in FIGS. 8 and 9, the second engagement surface 70 is angularly disposed relative to the axis A. More specifically, the first and second engagement surfaces 42, 70 face each other. Said differently, the first and second engagement surfaces 42, 70 are substantially parallel to one another. As set forth above, the actuator 58 rotates about the lever 24 from the unlocked position, as shown in FIGS. 5 and 8, to the locked position, as shown in FIGS. 6 and 9. Rotation of the actuator 58 from the unlocked position to the locked position facilitates engagement of the abutment surface 60 with the collet 54 and correspondingly moves the collet 54 from the first position to the second position along the axis A to sandwich the shroud 48 between the collet 54 and the retention surface 34 of the lever 24. More specifically, the second engagement surface 70 engages and slides along the first engagement surface 42 as the actuator 58 rotates about the lever 24 to the locked position. The collet 54 does not rotate as the actuator 58 rotates from the unlocked to locked position. As shown between FIGS. 8 and 9, the rotation of the actuator 58 is inversely shown. Said differently, between FIGS. 8 and 9 the actuator 58 is illustrated as if the actuator 58 does not rotate while the collet 54 and the lever 24 rotate relative to the actuator 58.

This convention was chosen to best show the engagement of the first and second engagement features 36, 68 by way of the cross-section. In reality, the actuator 58 rotates while the collet 54 and the lever 24 do not rotate. Furthermore, the cross-section through the collet 54 in FIG. 8 is different than the cross-section through the collet 54 in FIG. 9. Since for illustrative purposes only the collet 54 has rotated, it is best suited to continue the cross-section through the actuator 58 into the adjacent portion of the collet 54.

As set forth, above, the first and second engagement surfaces 42, 70 are angularly disposed relative to the axis A. The engagement and sliding of the second engagement surface 70 along the first engagement surface 42 as the actuator 58 rotates to the locked position facilitates axial movement of the actuator 58 toward the retention surface 34. As shown in FIGS. 8 and 9, the second engagement surface 70 engages and slides along the first engagement surface 42 until the stop wall 72 of the second engagement feature 68 abuts the protrusion 40 of the first engagement feature 36. The abutment of the stop wall 72 with protrusion 40 prevents the collet 54 from axially moving past the second position which can cause damage to one or more of the collet 54, the shroud 48, and the retention surface 34. The abutment of the stop wall 72 with protrusion 40 and can define the locked position of the actuator 58. It is to appreciated that the protrusion 40 may not abut the stop wall 72 and may instead may stop rotating due to the sandwiching of the shroud 48 between the collet 54 and the retention surface 34, which can also define the locked position.

Figure 12:
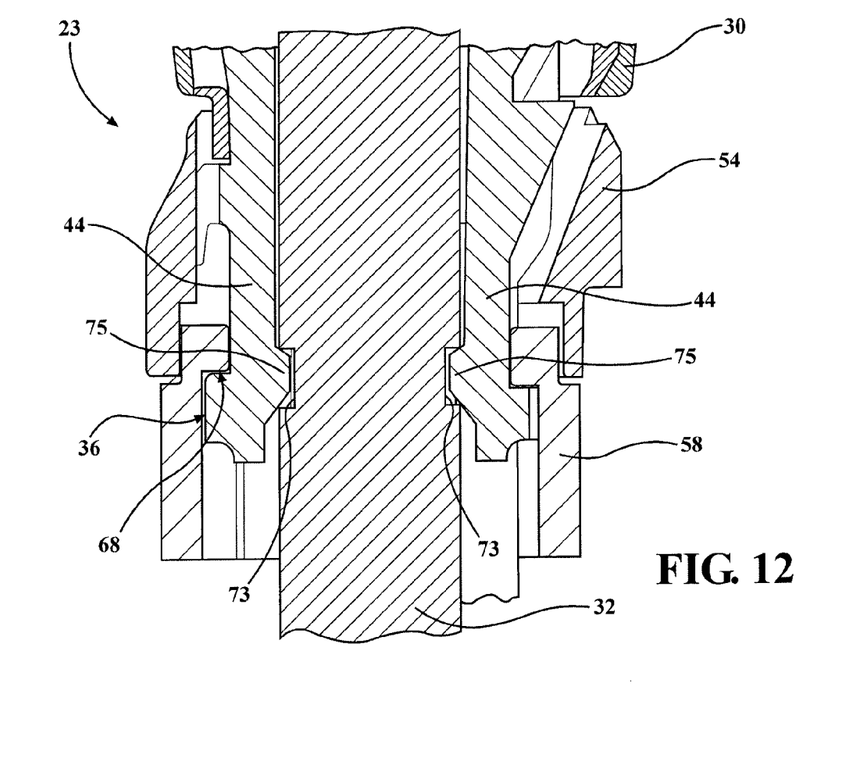
FIG. 12 is a cross-section view of the lever having a shaft the knob engaging the shaft.

As generally shown in FIGS. 12, the engagement of the first and second engagement features 36, 68 inhibits flexing of the arm 44 for preventing removal of the knob 30 from the shaft 32. The shaft 32 defines a pair of recesses 73 and each of the arms 44 include a finger 75 extending into the recesses 73. The fingers 75 engage the shaft 32 within the recesses 73 to inhibit axial and rotational movement of the knob 30 relative to the shaft 32. The engagement of the first and second engagement features 36, 68 facilitates abutment of the actuator 58 with the arms 44. The abutment of the actuator 58 with the arms 44 prevents flexing of the arms 44 away from the shaft 32 which maintains the fingers 75 within the recesses 73, preventing removal of the knob 30 from the shaft 32.

Figure 11:
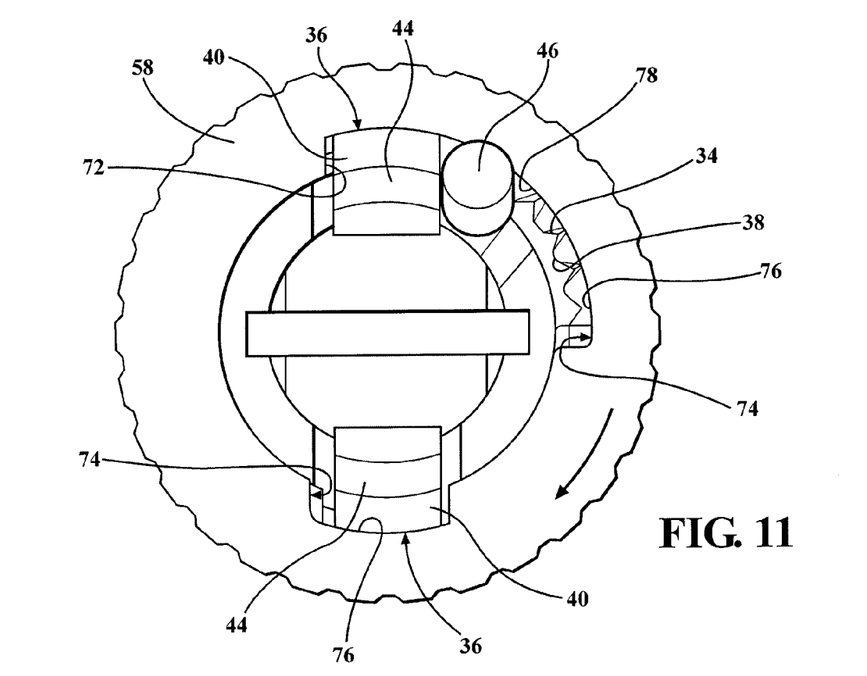
FIG. 11 is a plan view of the actuator and a cable of the shifter assembly with the actuator in the locked position.

As shown in FIG. 11, the actuator 58 defines an alignment feature 74 with the first engagement feature 36 of the lever 24 and the alignment feature 74 correspondingly configured to position the actuator 58 in the unlocked position to facilitate engagement of the first and second engagement features 36, 68. More specifically, the alignment feature 74 is further defined as a channel 76 with the protrusion 40 moving within the channel 76 to dispose the actuator 58 in the unlocked position and facilitate engagement of the first and second engagement features 36, 68. The channel 76 is further defined as a pair of channels 76 disposed between each of the second engagement features 68. The channels 76 extend substantially parallel to the axis A. Each of the second engagement surfaces 70 are individually disposed adjacent to the channels 76. The actuator 58 moves axially along the lever 24 toward the retention surface 34 with the protrusions 40 passing through the channels 76 to dispose the actuator 58 in the unlocked position with first and second engagement surfaces 42, 70 adjacent one another.

As shown in FIG. 7, the actuator has a resistance feature 77 adjacent the second engagement feature 68 and extending toward the lever 24 to engage the first engagement feature 36 as the first engagement feature 36 moves between disposition within the channel 76 and engagement with the second engagement surface 70 for resisting movement of the first engagement feature 36 into and out of the channel 76. More specifically, the resistance feature 77 is further defined as a rib 79 angularly projecting toward the lever 24 adjacent the second engagement surface 70. The rib 79 is transverse to the second engagement surface 70 and is substantially parallel to the channels 76. The protrusion 40 engages and rides up the rib 79 as the protrusion 40 moves from the channel 76 into engagement with the second engagement surface 70 in the unlocked position, with the angular configuration facilitating movement of the protrusion 40 into the unlocked position. Oppositely, the angular configuration of the rib 79 facilitates abutment with the rib 79 as the protrusion 40 moves from the second engagement surface 70 to the channel 76 which inhibits such movement. The angular configuration of the rib 79 prevents unwanted disposition of the protrusion 40 in the channel 76 after rotating the actuator 58 into the unlocked and locked positions which could result in the protrusions 40 moving within the channels 76 and the actuator 58 moving away from the collet 54.

Figure 10:
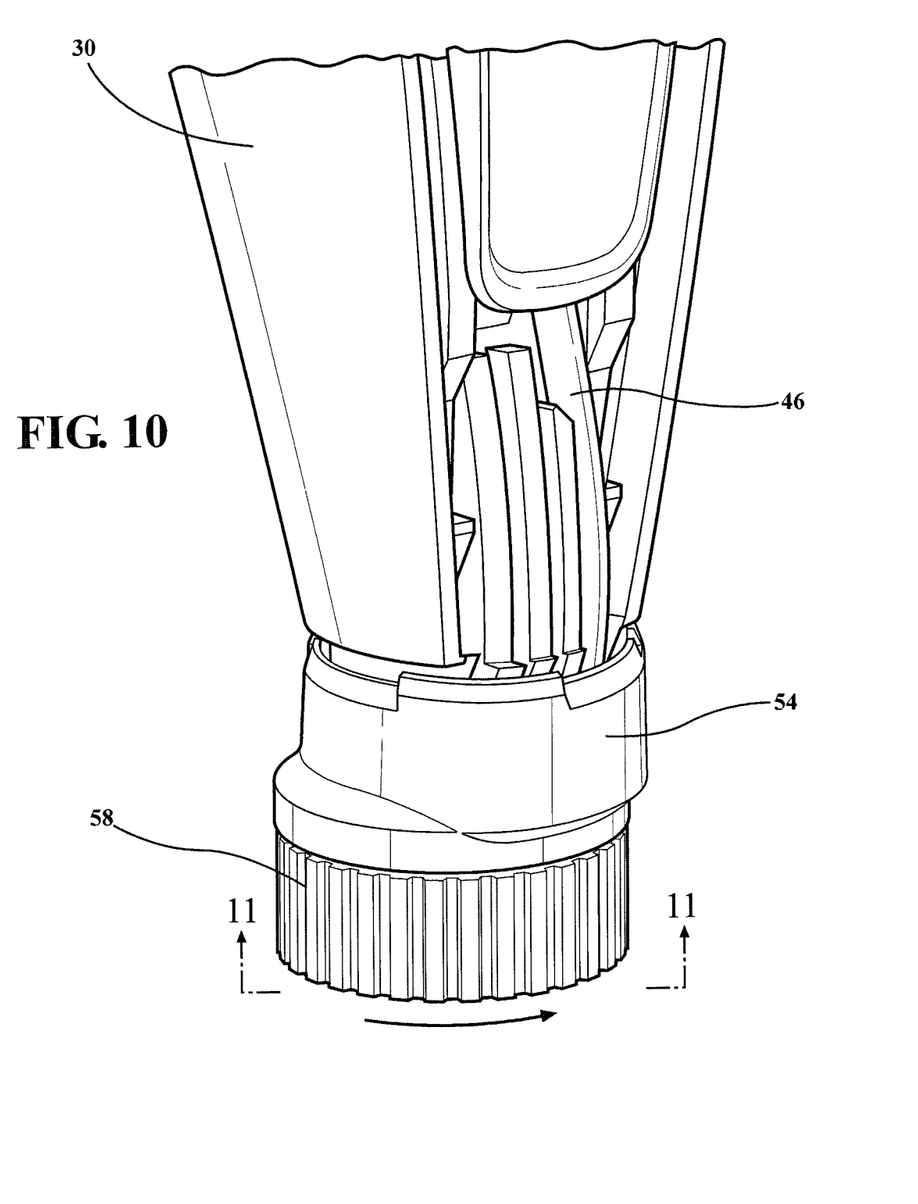
FIG. 10 is a perspective view of a knob of the lever, the collet, and the actuator of the shifter assembly.

The actuator 58 defines a cable passage 78. More specifically, one of the channels 76 is further defined as the cable passage 78. The cable passage 78 extends radially about actuator 58 such that the cable passage 78 is longer than the other channel 76. As best illustrated in FIGS. 10 and 11, the cable 46 extends through the cable passage 78. The cable passage 78 provides clearance during the rotation of the actuator 58 between the unlocked and locked positions such that the cable 46 remains stationary along the axis A. Said differently, the actuator 58 and the cable passage 78 rotate about the lever 24 such that the cable passage 78 moves with the cable 46 remaining stationary within the passage.

The actuator 58 and the collet 54 can have a grained surface to prevent unwanted noise created through engagement with the shroud 48. More specifically, any portion of the actuator 58 or the collet 54 can have the grained surface without escaping the scope of the subject invention.

The operation of sandwiching the shroud 48 between the collet 54 and the retention surface 34 of the lever 24 will be discussed below for illustrative purposes only. Specifically, the operation of assembling the shroud 48, the collet 54, the actuator 58, and the lever 24 will be set forth below.

As shown in FIG. 3, the shroud 48 is disposed about the lever 24 with the lever end 50 of the shroud 48 adjacent the retention surface 34. The collet 54 is axially disposed about and is moved along the shaft 32 of the lever 24 from the first end 26 of the lever 24 toward the retention surface 34 of the lever 24. The actuator 58 is axially disposed about and is moved along the shaft 32 of the lever 24 from the first end 26 of the lever 24 toward the retention surface 34 of the lever 24, with the cable 46 extending through the cable passage 78.

The actuator 58 is rotated such that the protrusions 40 of the first engagement feature 36 are axially aligned with the channels 76 of the alignment feature 74, as shown in FIG. 11. The protrusions 40 pass through the channels 76 as the actuator 58 continues to move axially along the shaft 32 toward the retention surface 34. The first engagement feature 36 engages the resistance feature 77 as the first engagement feature 36 moves from disposition within the channel 76 to engagement with the second engagement surface 70. As shown in FIGS. 5 and 8, the actuator 58 is disposed in the unlocked position with the first and second engagement surfaces 42, 70 adjacent and substantially parallel to one another.

The actuator 58 is rotated about the lever 24 from the unlocked position, as shown in FIG. 8, to the locked position, as shown in FIG. 9. The second engagement surface 70 engages and slides along the first engagement surface 42 as the actuator 58 rotates to the locked position. The angular disposition of the first and second engagement surfaces 42, 70 relative to the axis A facilitates axial movement of the actuator 58 toward the retention surface 34. Rotation of the actuator 58 from the unlocked position to the locked position facilitates engagement of the abutment surface 60 disposed on the lip 62 of the actuator 58 with the collet 54 within the notch 64 and correspondingly moves the collet 54 from the first position, as shown in FIG. 5, to the second position, as shown in FIG. 6, along the axis A.

As described above, the retention surface 34 has an angular configuration. The retention surface 34 projects progressively outwardly away from the actuator 58. The movement of the collet 54 toward the second position progressively sandwiches the lever end 50 of the shroud 48 between the collet 54 and the retention surface 34.

The second engagement surface 70 engages and slides along the first engagement surface 42 until the stop wall 72 of the second engagement feature 68 abuts the protrusion 40 of the first engagement feature 36, as shown in FIG. 9. The abutment of the stop wall 72 with protrusion 40 disposes the actuator 58 in the locked position and the collet 54 correspondingly in the second position.

The second engagement feature 68 engages the arm 44 as the actuator 58 rotates from the unlocked position to the locked position. The engagement of the second engagement feature 68 with the arm 44 flexes the arm 44 toward the axis A. The arm 44 abuts the shaft 32 of the lever 24. The abutment of the arm 44 with the shaft 32 further frictionally couples the knob 30 to the shaft 32.

The subject invention also provides for a method of assembling the shifter assembly 23 for selecting one of the plurality of gears of the transmission of the vehicle. As described above, and as shown in FIG. 3, the shifter utilizes the lever 24 extending along the axis A with the lever 24 having the retention surface 34 and defining the first engagement feature 36. The shroud 48 is at least partially disposed about the lever 24 and the collet 54 at least partially disposed about the lever 24. The actuator 58 has the second engagement feature 68 and the abutment surface 60.

The method includes the steps of rotating the actuator 58 about the lever 24 from the unlocked position, as shown in FIG. 8, to the locked position, as shown in FIG. 9, and engaging the second engagement feature 68 with the first engagement feature 36 during rotation of the actuator 58. The method further includes the steps of engaging the abutment surface 60 of the actuator 58 with the collet 54, as shown in FIG. 5, and moving the collet 54 along the axis A from the first position spaced from the retention surface 34 to the second position, as shown in FIG. 6, during rotation of the actuator 58. Furthermore, the method includes the step of sandwiching the shroud 48 between the collet 54 and the retention surface 34 when in the second position.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A shifter assembly for selecting one of a plurality of gears of a transmission of a vehicle, said shifter assembly comprising:
  a lever extending along an axis with said lever having a retention surface and defining a first engagement feature;
  a shroud at least partially disposed about said lever to at least partially conceal said lever;
  a collet at least partially disposed about said lever and movable along said axis between a first position spaced from said retention surface and a second position sandwiching said shroud between said collet and said retention surface;
  an actuator having a second engagement feature selectively engaging said first engagement feature of said lever and having an abutment surface selectively engaging said collet with said actuator rotating about said lever from an unlocked position to a locked position facilitating engagement of said abutment surface with said collet and correspondingly moving said collet from said first position to said second position along said axis to sandwich said shroud between said collet and said retention surface of said lever.

2. A shifter assembly as set forth in claim 1 wherein said actuator has an annular configuration facilitating continued engagement of said abutment surface with said collet during said rotation of said actuator from said unlocked position to said locked position.

3. A shifter assembly as set forth in claim 1 wherein said retention surface has an angular configuration with said retention surface projecting progressively outward away from said actuator with said angular configuration facilitating increased sandwiching of said shroud as said collet moves from said first position to said second position.

4. A shifter assembly as set forth in claim 1 wherein said first engagement feature has a first engagement surface and said second engagement feature has a second engagement surface each transverse to said axis and facing each other with said second engagement surface engaging and sliding along said first engagement surface as said actuator rotates about said lever to said locked position.

5. A shifter assembly as set forth in claim 4 wherein said first and second engagement surfaces are angularly disposed relative to said axis with said engaging and sliding of said second engagement surface along said first engagement surface as said actuator rotates to said locked position facilitating axial movement of said actuator toward said retention surface.

6. A shifter assembly as set forth in claim 1 wherein said retention surface defines a plurality of teeth projecting radially from said axis with said teeth penetrating said shroud for gripping said shroud sandwiched between said collet and said retention surface of said lever in said second position.

7. A shifter assembly as set forth in claim 6 wherein said teeth extend longitudinally along said lever to facilitate said collet and said shroud sliding along said teeth and simultaneously penetrating said shroud with said teeth as said collet moves from said first position to said second position.

8. A shifter assembly as set forth in claim 1 wherein said actuator defines an alignment feature with said first engagement feature of said lever and said alignment feature correspondingly configured to position said actuator in said unlocked position to facilitate engagement of said first and second engagement features.

9. A shifter assembly as set forth in claim 8 wherein said first engagement feature is further defined as a protrusion and said alignment feature is further defined as a channel with said protrusion moving within said channel to dispose said actuator in said unlocked position and facilitate engagement of said first and second engagement features.

10. A shifter assembly as set forth in claim 9 wherein said actuator has a resistance feature adjacent said second engagement feature and extending toward said lever to engage said first engagement feature as said first engagement feature moves between disposition within said channel and engagement with said second engagement surface for resisting movement of said first engagement feature into and out of said channel.

11. A shifter assembly as set forth in claim 1 wherein said lever includes a knob and a shaft with said knob disposed along said shaft and said first engagement feature disposed on said knob.

12. A shifter assembly as set forth in claim 11 wherein said knob has at least one arm extending along said axis with said first engagement feature disposed on said arm with said engagement of said first and second engagement features inhibiting flexing of said arm for preventing removal of said knob from said shaft.

13. A shifter assembly as set forth in claim 1 wherein said actuator has a lip extending toward said collet with said abutment surface disposed on said lip and said collet defines a notch with said lip extending into said notch, said lip and said notch configured to maintain engagement of said abutment surface with said collet as said actuator rotates about said lever from said unlocked position to said locked position.

14. A shifter assembly as set forth in claim 1 wherein said collet has an annular configuration facilitating sandwiching of said shroud between said collet and said retention surface entirely about said lever.

15. A shifter assembly as set forth in claim 1 wherein said lever includes a cable disposed along said axis and said actuator defines a cable passage with said cable extending through said cable passage and said cable passage providing clearance during said rotation of said actuator between said unlocked and locked positions such that said cable remains stationary along said axis.

16. A method of assembling a shifter assembly for selecting one of a plurality of gears of a transmission of a vehicle utilizing a lever extending along an axis with the lever having a retention surface and defining a first engagement feature, a shroud at least partially disposed about the lever, a collet at least partially disposed about the lever, and an actuator having a second engagement feature and an abutment surface; the method comprising the steps of:
  rotating the actuator about the lever from an unlocked position to a locked position;
  engaging the second engagement feature with the first engagement feature during rotation of the actuator;
  engaging the abutment surface of the actuator with the collet;
  moving the collet along the axis from a first position spaced from the retention surface to a second position during rotation of the actuator; and
  sandwiching the shroud between the collet and the retention surface when in the second position.

* * * * *